US012775198B2

(12) United States Patent
Kamei

(10) Patent No.: US 12,775,198 B2
(45) Date of Patent: Oct. 27, 2026

(54) GRIP SURFACE

(71) Applicant: FUJIFILM Corporation, Tokyo (JP)

(72) Inventor: Keita Kamei, Saitama (JP)

(73) Assignee: FUJIFILM Corporation, Tokyo (JP)

(*) Notice: Subject to any disclaimer, the term of this patent is extended or adjusted under 35 U.S.C. 154(b) by 136 days.

(21) Appl. No.: 18/590,895

(22) Filed: Feb. 28, 2024

(65) Prior Publication Data

US 2024/0302723 A1 Sep. 12, 2024

(30) Foreign Application Priority Data

Mar. 10, 2023 (JP) ................................ 2023-037919

(51) Int. Cl.
*G03B 17/56* (2021.01)

(52) U.S. Cl.
CPC ...... *G03B 17/563* (2013.01); *G03B 2217/002* (2013.01)

(58) Field of Classification Search
None
See application file for complete search history.

(56) References Cited

U.S. PATENT DOCUMENTS 5,708,897 A 1/1998 Manabe et al.
D978,230 S * 2/2023 Li ................................ D16/244
2007/0082750 A1* 4/2007 Rose ...................... A63B 60/14 473/300
2013/0094196 A1* 4/2013 Wessel ................... F16M 11/28 362/198
2015/0316837 A1* 11/2015 Maltese ............. F16M 11/2057 29/525.08

FOREIGN PATENT DOCUMENTS

JP H09211626 8/1997
JP H10161206 6/1998
JP 2000066285 3/2000
JP 2002162685 6/2002
JP 2014026297 2/2014
WO WO-2021187436 A1 * 9/2021 ............... H05K 5/03

OTHER PUBLICATIONS

"Notification of Reasons for Refusal of China Counterpart Application", issued on Oct. 8, 2024, with English translation thereof, p. 1-p. 5.

* cited by examiner

*Primary Examiner* — Rodney E Fuller
(74) *Attorney, Agent, or Firm* — JCIPRNET

(57) ABSTRACT

An apparatus includes a grip portion having a surface shape portion. The surface shape portion has a first shape portion extending in a first direction, and a second shape portion extending in a second direction and/or a third shape portion extending in a third direction.

28 Claims, 14 Drawing Sheets

GRIP SURFACE

CROSS-REFERENCE TO RELATED APPLICATIONS

This application claims priority under 35 USC 119 from Japanese Patent Application No. 2023-037919 filed on Mar. 10, 2023, the disclosure of which is incorporated by reference herein.

BACKGROUND OF THE INVENTION

1. Field of the Invention

The technology of the present disclosure relates to an apparatus.

2. Description of the Related Art

JP1998-161206A (JP-H10-161206A) discloses a camera comprising a finger grip formed on a surface of a camera body, the finger grip consisting of a convex portion or a concave portion for giving tactile sensation of a position of a fingertip of a right hand in a case of gripping with the right hand, in which the finger grip is provided such that the finger grip fits between a camera body side surface on a side gripped by the right hand and a pressing center line of a shutter button in a case where the camera body is viewed from a front.

JP1997-211626A (JP-H09-211626A) discloses a camera comprising a body main body portion of which a front surface is covered with a metal front cover, in which a grip portion is integrally molded to a plastic inner frame that is incorporated on an inner surface side of the front cover and that is connected to the body main body portion, and the grip portion is exposed to a surface from the front cover.

JP2014-026297A discloses an exterior structure of a portable device comprising a side cover that protects the portable device, a plurality of cover members, and a main chassis that holds an interior member, in which the plurality of cover members are engaged and positioned in an engagement groove formed in the side cover, and the plurality of cover members are fixed by the side cover and the main chassis.

JP2002-162685A discloses an adapter for a shutter release that can be attached to a camera, the adapter comprising an adapter-side release button for shutter release operation provided on an adapter body, and a transmitting member that transmits an external force applied to the adapter-side release button to a camera-side release button of a camera body, in which the adapter-side release button is configured to be pressed in a direction different from a pressing operation direction of a camera release button.

JP2000-066285A discloses a film unit with a lens in which an unexposed photographic film is loaded in advance, the film unit comprising a simple imaging mechanism such as an imaging lens or a shutter mechanism, in which first and second release buttons that operate the shutter mechanism are provided at both end portions of an upper surface of the film unit with a lens, respectively.

SUMMARY OF THE INVENTION

One embodiment according to the technology of the present disclosure provides an apparatus capable of improving grip performance of a grip portion, for example, in comparison with a case where the grip portion has unevenness, for example, by means of etching.

A first aspect according to the technology of the present disclosure is an apparatus comprising a grip portion having a surface shape portion, in which the surface shape portion has a first shape portion extending in a first direction, and a second shape portion extending in a second direction and/or a third shape portion extending in a third direction.

A second aspect according to the technology of the present disclosure is the apparatus according to the first aspect, in which the grip portion has a plurality of the surface shape portions.

A third aspect of the technology of the present disclosure is the apparatus according to the first or second aspect, in which a plurality of the surface shape portions form a repeating pattern.

A fourth aspect according to the technology of the present disclosure is the apparatus according to the third aspect, in which the repeating pattern includes an embossed pattern.

A fifth aspect of the technology of the present disclosure is the apparatus according to any one of the first to fourth aspects, in which the surface shape portion is formed in a three-dimensional shape.

A sixth aspect of the technology of the present disclosure is the apparatus according to any one of the first to fifth aspects, in which the surface shape portion has the second shape portion and the third shape portion.

A seventh aspect of the technology of the present disclosure is the apparatus according to any one of the first to sixth aspects, in which the first shape portion extends from a central portion of the surface shape portion, and the second shape portion and/or the third shape portion extends from the central portion.

An eighth aspect of the technology of the present disclosure is the apparatus according to any one of the first to seventh aspects, in which the first direction is a direction of gravitational force of the apparatus, and the second direction and/or the third direction is a direction tilted with respect to the direction of gravitational force.

A ninth aspect of the technology of the present disclosure is the apparatus according to the eighth aspect, in which the second shape portion and/or the third shape portion is positioned on an upper side of the first shape portion in the direction of gravitational force.

A tenth aspect of the technology of the present disclosure is the apparatus according to the eighth or ninth aspect, in which the first shape portion extends downward from a central portion of the surface shape portion in the direction of gravitational force, and the second shape portion and/or the third shape portion extends obliquely upward from the central portion.

An eleventh aspect of the technology of the present disclosure is the apparatus according to any one of the first to tenth aspects, in which the apparatus is an imaging apparatus.

A twelfth aspect of the technology of the present disclosure is the apparatus according to any one of the first to eleventh aspects, in which the first shape portion, and the second shape portion and/or the third shape portion are formed in the same shape.

A thirteenth aspect of the technology of the present disclosure is the apparatus according to any one of the first to twelfth aspects, in which the first shape portion, and the second shape portion and/or the third shape portion are connected to each other.

A fourteenth aspect of the technology of the present disclosure is the apparatus according to any one of the first to twelfth aspects, in which the first shape portion, and the second shape portion and/or the third shape portion are separated from each other.

A fifteenth aspect of the technology of the present disclosure is the apparatus according to any one of the first to fourteenth aspects, in which an angle formed between the first shape portion and the second shape portion or the third shape portion is an obtuse angle.

A sixteenth aspect according to the technology of the present disclosure is the apparatus according to the fifteenth aspect, in which the angle is 120°.

A seventeenth aspect of the technology of the present disclosure is the apparatus according to any one of the first to sixteenth aspects, in which an end portion of the first shape portion in the first direction is formed in an arc shape or a distal end angle shape, and an end portion of the second shape portion in the second direction and/or an end portion of the third shape portion in the third direction is formed in an arc shape or a distal end angle shape.

An eighteenth aspect of the technology of the present disclosure is the apparatus according to any one of the fourth aspect subordinate to the third aspect to the seventeenth aspect, in which the repeating pattern is a pattern in which the plurality of surface shape portions are arranged along the first direction and are arranged along the second direction and/or the third direction.

A nineteenth aspect of the technology of the present disclosure is the apparatus according to the eighteenth aspect, in which each of the surface shape portions has the second shape portion and the third shape portion, the repeating pattern is a pattern in which the plurality of surface shape portions are arranged along the first direction, the second direction, and the third direction, and the repeating pattern is a pattern in which the first shape portion of the other surface shape portion of the surface shape portions adjacent in the first direction enters a first region, which is a region between the second shape portion and the third shape portion of one surface shape portion of the surface shape portions adjacent in the first direction, the second shape portion of the other surface shape portion of the surface shape portions adjacent in the second direction enters a second region, which is a region between the first shape portion and the third shape portion of one surface shape portion of the surface shape portions adjacent in the second direction, and the third shape portion of the other surface shape portion of the surface shape portions adjacent in the third direction enters a third region, which is a region between the first shape portion and the second shape portion of one surface shape portion of the surface shape portions adjacent in the third direction.

A twentieth aspect of the technology of the present disclosure is the apparatus according to any one of the first to nineteenth aspects, in which the surface shape portion has the second shape portion, the first shape portion and the second shape portion are formed in a three-dimensional shape, respectively, a first top portion, which is a top portion of the first shape portion, has a first ridge line that is a ridge line extending in the first direction, and a second top portion, which is a top portion of the second shape portion, has a second ridge line that is a ridge line extending in the second direction.

A twenty-first aspect of the technology of the present disclosure is the apparatus according to the twentieth aspect, in which the surface shape portion has the third shape portion, the third shape portion is formed in a three-dimensional shape, and a third top portion, which is a top portion of the third shape portion, has a third ridge line that is a ridge line extending in the third direction.

A twenty-second aspect of the technology of the present disclosure is the apparatus according to the twentieth or twenty-first aspect, in which the three-dimensional shape of the first shape portion is a three-dimensional shape in which a width expands in a direction orthogonal to the first direction from the first top portion toward a first base portion, which is a base portion of the first shape portion, and the three-dimensional shape of the second shape portion is a three-dimensional shape in which a width expands in a direction orthogonal to the second direction from the second top portion toward a second base portion, which is a base portion of the second shape portion.

A twenty-third aspect of the technology of the present disclosure is the apparatus according to any one of the first to twenty-second aspects, in which the three-dimensional shape of the third shape portion is a three-dimensional shape in which a width expands in a direction orthogonal to the third direction from the third top portion toward a third base portion, which is a base portion of the third shape portion.

A twenty-fourth aspect of the technology of the present disclosure is the apparatus according to any one of the first to twenty-third aspects, in which the surface shape portion is formed by using a mold having a laser-processed molding surface.

A twenty-fifth aspect of the technology of the present disclosure is an apparatus comprising a grip portion having a surface shape portion, in which the surface shape portion is formed in a shape that generates a component of a force in a direction intersecting a second direction or a third direction in a case where a grip force is applied to the surface shape portion in a direction intersecting a first direction.

A twenty-sixth aspect according to the technology of the present disclosure is the apparatus according to the twenty-fifth aspect, in which the component of a force is a component of a force as a lifting force.

A twenty-seventh aspect of the technology of the present disclosure is the apparatus according to the twenty-fifth or twenty-sixth aspect, in which the surface shape portion is formed in a shape in which a grip force to the surface shape portion is strengthened in a case where the grip force is applied to the surface shape portion in the direction intersecting the first direction than in a case where the grip force is applied to the surface shape portion in a direction of gravitational force, which prevents the apparatus from falling off.

A twenty-eighth aspect of the technology of the present disclosure is an apparatus comprising a grip portion having a surface shape portion, in which the surface shape portion has a first shape portion that extends in an intersection direction with a grip direction, which is a direction in which a grip force is applied to the surface shape portion, and a second shape portion and/or a third shape portion that extends in a tilt direction with respect to the intersection direction and that generates a component of a force as a lifting force in a case where the grip force is applied to the surface shape portion.

DESCRIPTION OF THE PREFERRED EMBODIMENTS

Hereinafter, an example of embodiments of an apparatus according to the embodiments of the technology of the present disclosure will be described in accordance with the appended drawings.

Figure 1:
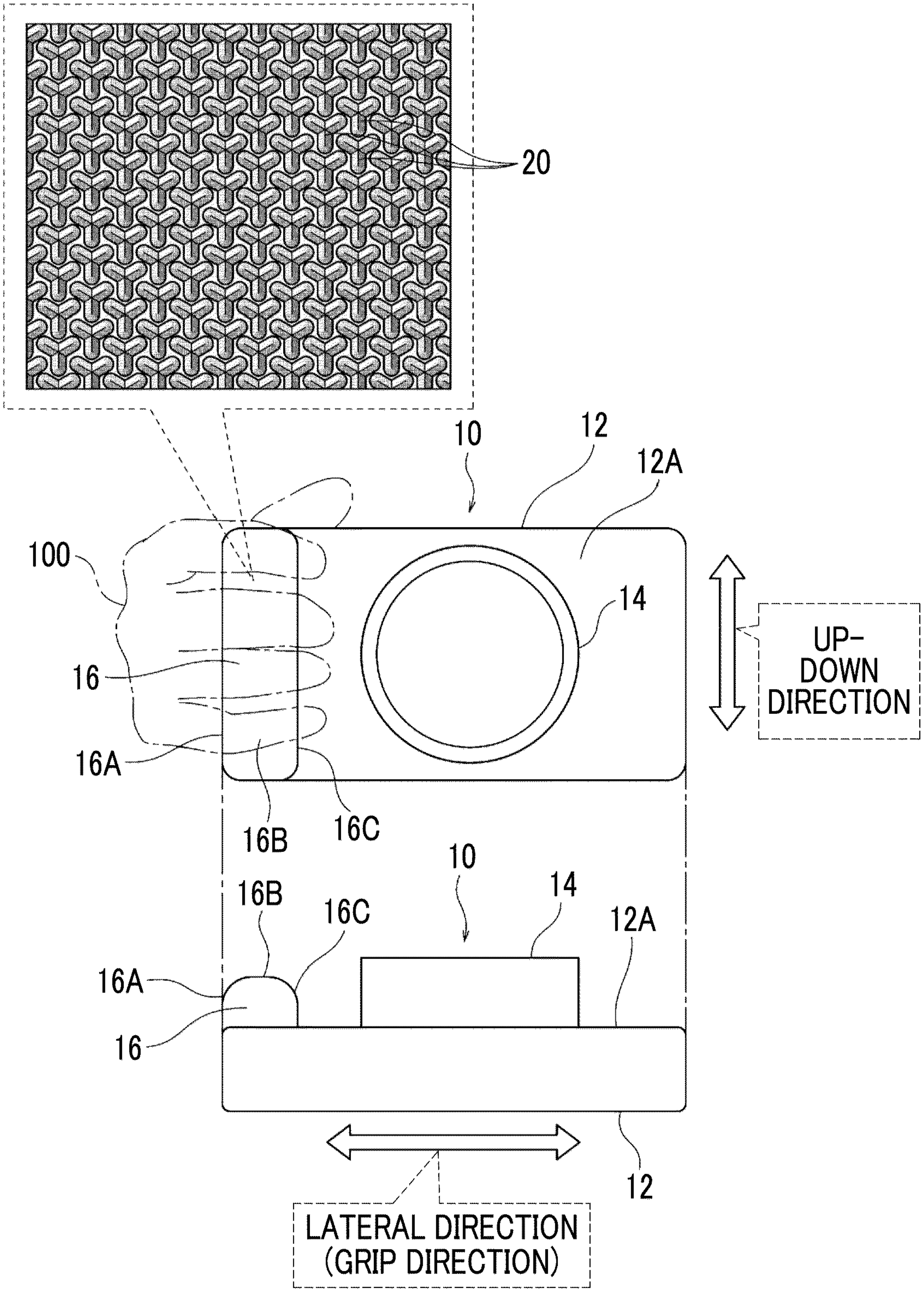
FIG. 1 is a two-view diagram showing an example of an imaging apparatus according to an embodiment.

FIG. 1 is a two-view diagram (that is, a front view and a bottom view) showing an example of an imaging apparatus 10 according to an embodiment. The imaging apparatus 10 is a digital camera, for example. The imaging apparatus 10 is an example of an apparatus according to the technology of the present disclosure. The imaging apparatus 10 comprises an imaging apparatus body 12, a lens unit 14, and a grip portion 16. The lens unit 14 is provided on a front surface 12A of the imaging apparatus body 12. The grip portion 16 is provided on one end side (for example, a right side) of the imaging apparatus body 12 in a lateral direction. The grip portion 16 protrudes toward a front side of the imaging apparatus body 12 with respect to the front surface 12A. The grip portion 16 extends in an up-down direction of the imaging apparatus body 12. The grip portion 16 is gripped by a hand 100 of a user from both sides of the imaging apparatus 10 in the lateral direction. Hereinafter, the lateral direction of the imaging apparatus 10 may be referred to as a grip direction.

The grip portion 16 has a plurality of surface shape portions 20. The plurality of surface shape portions 20 are formed on a surface of the grip portion 16. Specifically, the plurality of surface shape portions 20 are formed to be distributed over a right side surface 16A, a front surface 16B, and a left side surface 16C of the grip portion 16. As an example, the plurality of surface shape portions 20 are formed in the same shape as each other.

The plurality of the surface shape portions 20 form a repeating pattern on the surface of the grip portion 16. The repeating pattern is a repeating pattern including an embossed pattern. The embossed pattern referred to here refers to a three-dimensional pattern. That is, each surface shape portion 20 is formed in a three-dimensional shape having a height with respect to the surface of the grip portion 16. In a case where each surface shape portion 20 is formed in a three-dimensional shape, the hand 100 is caught on the grip portion 16, and thus the grip portion 16 exhibits grip performance. The grip performance referred to here refers to performance indicating difficulty of sliding of the grip portion 16 to a lower side in a vertical direction in a case where the user grips the grip portion 16 from both sides of the imaging apparatus 10 in the lateral direction.

Figure 2:
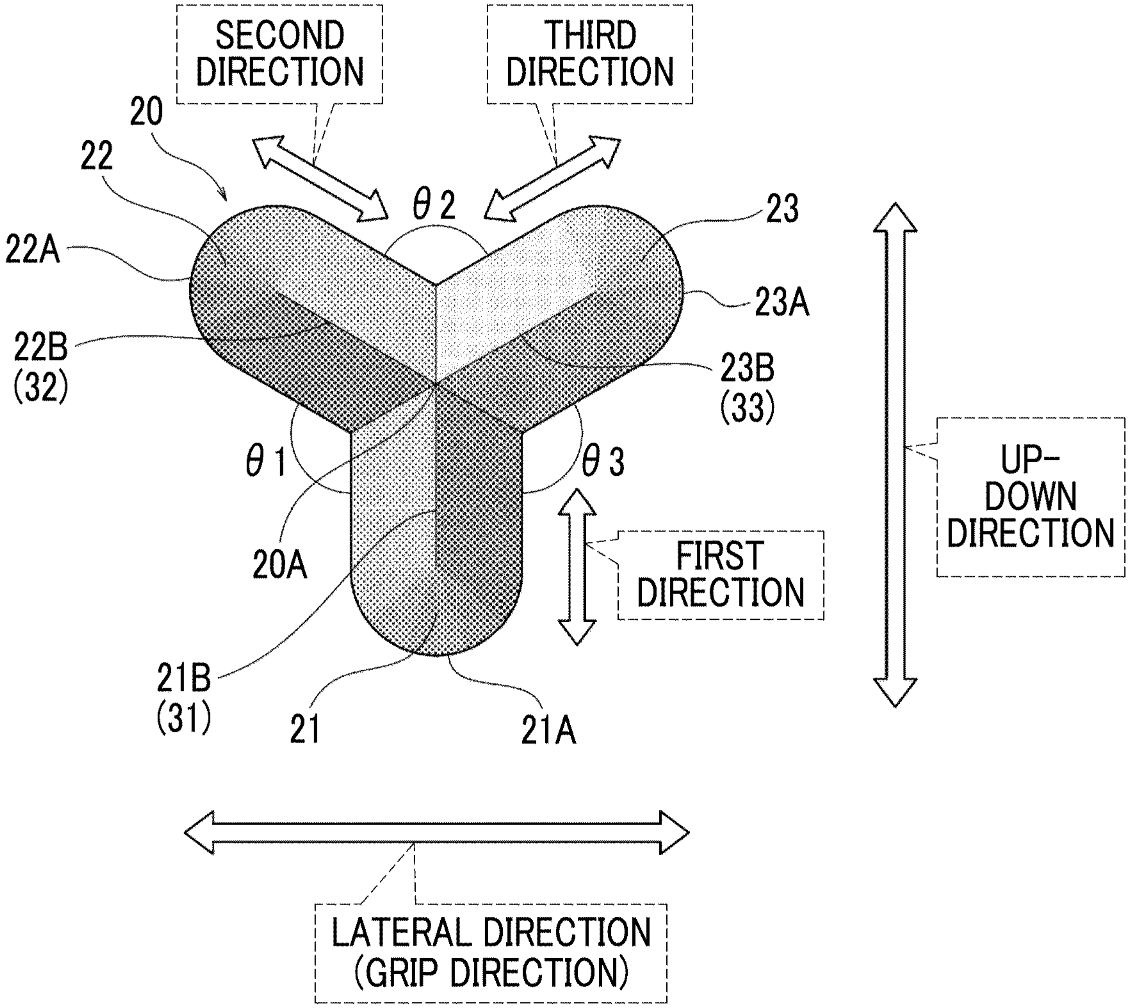
FIG. 2 is an enlarged diagram of a surface shape portion shown in FIG. 1.

FIG. 2 is an enlarged diagram of a surface shape portion 20 shown in FIG. 1. Each surface shape portion 20 has a first shape portion 21, a second shape portion 22, and a third shape portion 23. The first shape portion 21, the second shape portion 22, and the third shape portion 23 extend in different directions from each other. That is, the first shape portion 21 extends in a first direction, the second shape portion 22 extends in a second direction, and the third shape portion 23 extends in a third direction. The first direction is the up-down direction of the imaging apparatus 10, and the second direction and the third direction are directions tilted with respect to the up-down direction, respectively. The up-down direction of the imaging apparatus 10 corresponds to a direction of gravitational force (that is, the vertical direction) in a case where the imaging apparatus 10 is used in the lateral direction. The first direction is a direction orthogonal to the grip direction as an example of a direction intersecting the grip direction.

The first shape portion 21 extends downward from a central portion 20A of the surface shape portion 20 in the up-down direction, and the second shape portion 22 and the third shape portion 23 extend obliquely upward from the central portion 20A, respectively. The second shape portion 22 and the third shape portion 23 are positioned on an upper side of the first shape portion 21 in the up-down direction. The upper side in the up-down direction corresponds to a side opposite to a side on which gravitational force acts (that is, an antigravity side). The first shape portion 21, the second shape portion 22, and the third shape portion 23 are connected to each other at the central portion 20A (specifically, a portion on a center side of the surface shape portion 20).

As an example, the first shape portion 21, the second shape portion 22, and the third shape portion 23 are formed in the same shape as each other. The first shape portion 21, the second shape portion 22, and the third shape portion 23 are formed rotationally symmetrically about the central portion 20A (specifically, the central portion of the surface shape portion 20). In a case where an angle formed between the first shape portion 21 and the second shape portion 22 is defined as θ1, an angle formed between the second shape portion 22 and the third shape portion 23 is defined as θ2, and an angle formed between the third shape portion 23 and the first shape portion 21 is defined θ3, angles θ1, θ2, and θ3 are all obtuse angles (for example, 120°).

A first end portion 21A, which is an end portion of the first shape portion 21 in the first direction (that is, an end portion of the first shape portion 21 on a side opposite to the central portion 20A), is a distal end portion of the first shape portion 21, and the first end portion 21A is formed in an arc shape. Similarly, a second end portion 22A, which is an end portion of the second shape portion 22 in the second direction (that is, an end portion of the second shape portion 22 on a side opposite to the central portion 20A), is a distal end portion of the second shape portion 22, and the second end portion 22A is formed in an arc shape. In addition, a third end portion 23A, which is an end portion of the third shape portion 23 in the third direction (that is, an end portion of the third shape portion 23 on a side opposite to the central portion 20A), is a distal end portion of the third shape portion 23, and the third end portion 23A is formed in an arc shape.

The first shape portion 21, the second shape portion 22, and the third shape portion 23 are formed in a three-dimensional shape, respectively. The first shape portion 21 has a first top portion 21B that is a top portion, the second shape portion 22 has a second top portion 22B that is a top portion, and the third shape portion 23 has a third top portion 23B that is a top portion. The first top portion 21B has a first ridge line 31 that is a ridge line extending in the first direction, the second top portion 22B has a second ridge line 32 that is a ridge line extending in the second direction, and the third top portion 23B has a third ridge line 33 that is a ridge line extending in the third direction.

The first ridge line 31 extends in the first direction from the central portion 20A of the surface shape portion 20 and terminates on a central portion 20A side with respect to the first end portion 21A. The second ridge line 32 extends in the second direction from the central portion 20A of the surface shape portion 20 and terminates on a central portion 20A side with respect to the second end portion 22A. The third ridge line 33 extends in the third direction from the central portion 20A of the surface shape portion 20 and terminates on a central portion 20A side with respect to the third end portion 23A.

Figure 3:
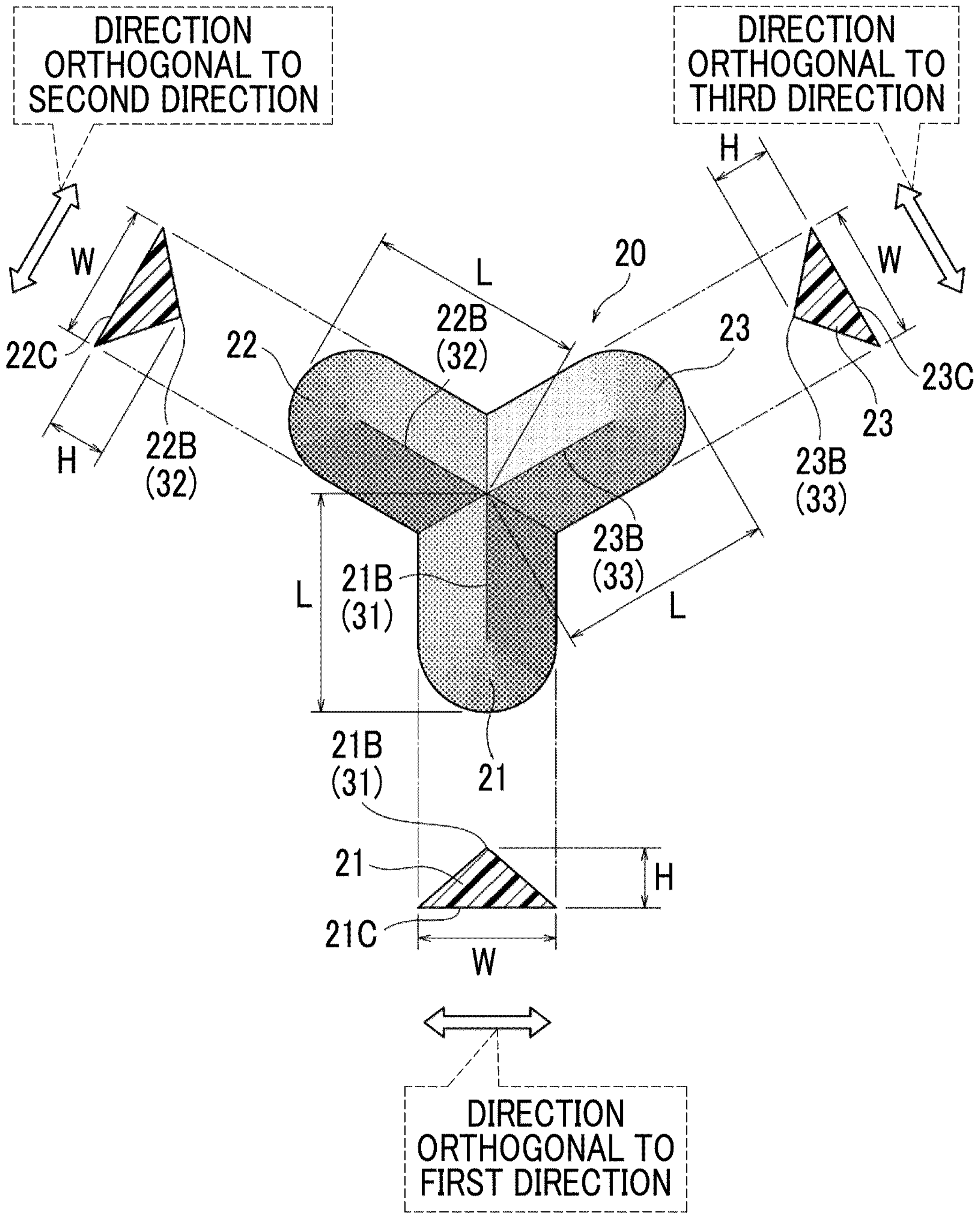
FIG. 3 is a diagram showing cross sections of a first shape portion, a second shape portion, and a third shape portion shown in FIG. 2.

FIG. 3 is a diagram showing cross sections of a first shape portion 21, a second shape portion 22, and a third shape portion 23 shown in FIG. 2. In FIG. 3, dimensions of the first shape portion 21, the second shape portion 22, and the third shape portion 23 in each height direction are shown exaggerated. The first shape portion 21 has a first base portion 21C that is a base portion. The first base portion 21C is a portion of the first shape portion 21 that faces the first top portion 21B in the height direction of the first shape portion 21. The three-dimensional shape of the first shape portion 21 is a three-dimensional shape in which a width expands in a direction orthogonal to the first direction from the first top portion 21B toward the first base portion 21C.

Similarly, the three-dimensional shape of the second shape portion 22 is a three-dimensional shape in which a width expands in a direction orthogonal to the second direction from the second top portion 22B toward a second base portion 22C, which is a base portion of the second shape portion 22, and the three-dimensional shape of the third shape portion 23 is a three-dimensional shape in which a width expands in a direction orthogonal to the third direction from the third top portion 23B toward a third base portion 23C, which is a base portion of the third shape portion 23.

In the description of this specification, "orthogonal" refers to "orthogonal" in the sense of including an error that is generally allowed in the technical field to which the technology of the present disclosure belongs and that is not contrary to the gist of the technology of the present disclosure, in addition to perfect orthogonality. In this specification, the term "orthogonal" is not limited to "orthogonal" and may be "intersecting".

Each height H of the first shape portion 21, the second shape portion 22, and the third shape portion 23 is 0.1 mm or more and 0.5 mm or less. Here, in a case where the height H is more than 0.1 mm, as compared with a case where appropriate grip performance is obtained, a finger is excessively caught, which leads to pain in the finger. In addition, in a case where the height H is less than 0.1 mm, as compared with a case where appropriate grip performance is obtained, the finger is caught weakly, which makes it impossible to obtain grip performance. On the other hand, in a case where the height H is 0.1 mm or more and 0.5 mm or less, appropriate grip performance is obtained.

Each width W of the first shape portion 21, the second shape portion 22, and the third shape portion 23 is 0.5 mm or more and 1.2 mm or less. Here, in a case where the width W is more than 1.2 mm, as compared with a case where appropriate grip performance is obtained, the number of the surface shape portions 20 caught by the fingers is insufficient, resulting in insufficient grip force. In addition, in a case where the width W is less than 0.5 mm, as compared with a case where appropriate grip performance is obtained, the finger is caught weakly, which makes it impossible to obtain grip performance. On the other hand, in a case where the width W is 0.5 mm or more and 1.2 mm or less, appropriate grip performance is obtained.

Each length L of the first shape portion 21, the second shape portion 22, and the third shape portion 23 is 0.5 mm or more and 2 mm or less. Here, in a case where the length L is more than 2 mm, as compared with a case where appropriate grip performance is obtained, the number of the surface shape portions 20 caught by the fingers is insufficient, resulting in insufficient grip force. In addition, in a case where the length L is less than 0.5 mm, as compared with a case where appropriate grip performance is obtained, the finger is caught weakly, which makes it impossible to obtain grip performance. On the other hand, in a case where the length L is 0.5 mm or more and 2 mm or less, appropriate grip performance is obtained. The appropriate grip performance is determined by, for example, a performance evaluation test or the like.

Figure 4:
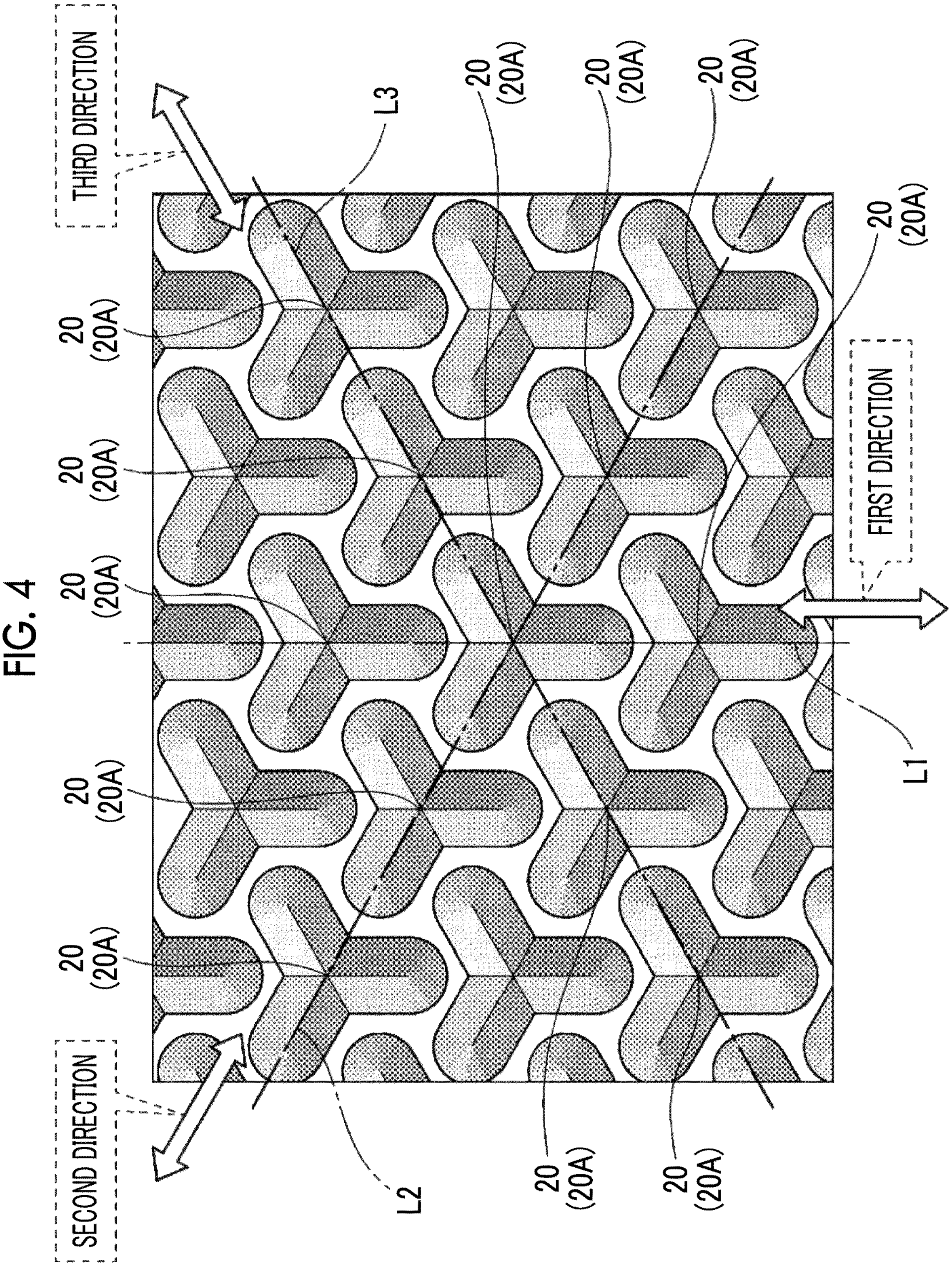
FIG. 4 is a diagram showing a part of a repeating pattern formed by a plurality of the surface shape portions shown in FIG. 1.

FIG. 4 is a diagram showing a part of a repeating pattern formed by a plurality of the surface shape portions 20 shown in FIG. 1. The plurality of surface shape portions 20 are arranged along the first direction, the second direction, and the third direction to form a repeating pattern having regularity. The plurality of surface shape portions 20 are formed in the same direction as each other. A first line L1 is a line extending in the first direction, a second line L2 is a line extending in the second direction, and a third line L3 is a line extending in the third direction. As an example, the plurality of surface shape portions 20 are arranged such that each central portion 20A (specifically, a central portion of each surface shape portion 20) is positioned on the first line L1, the second line L2, and the third line L3, respectively.

Figure 5:
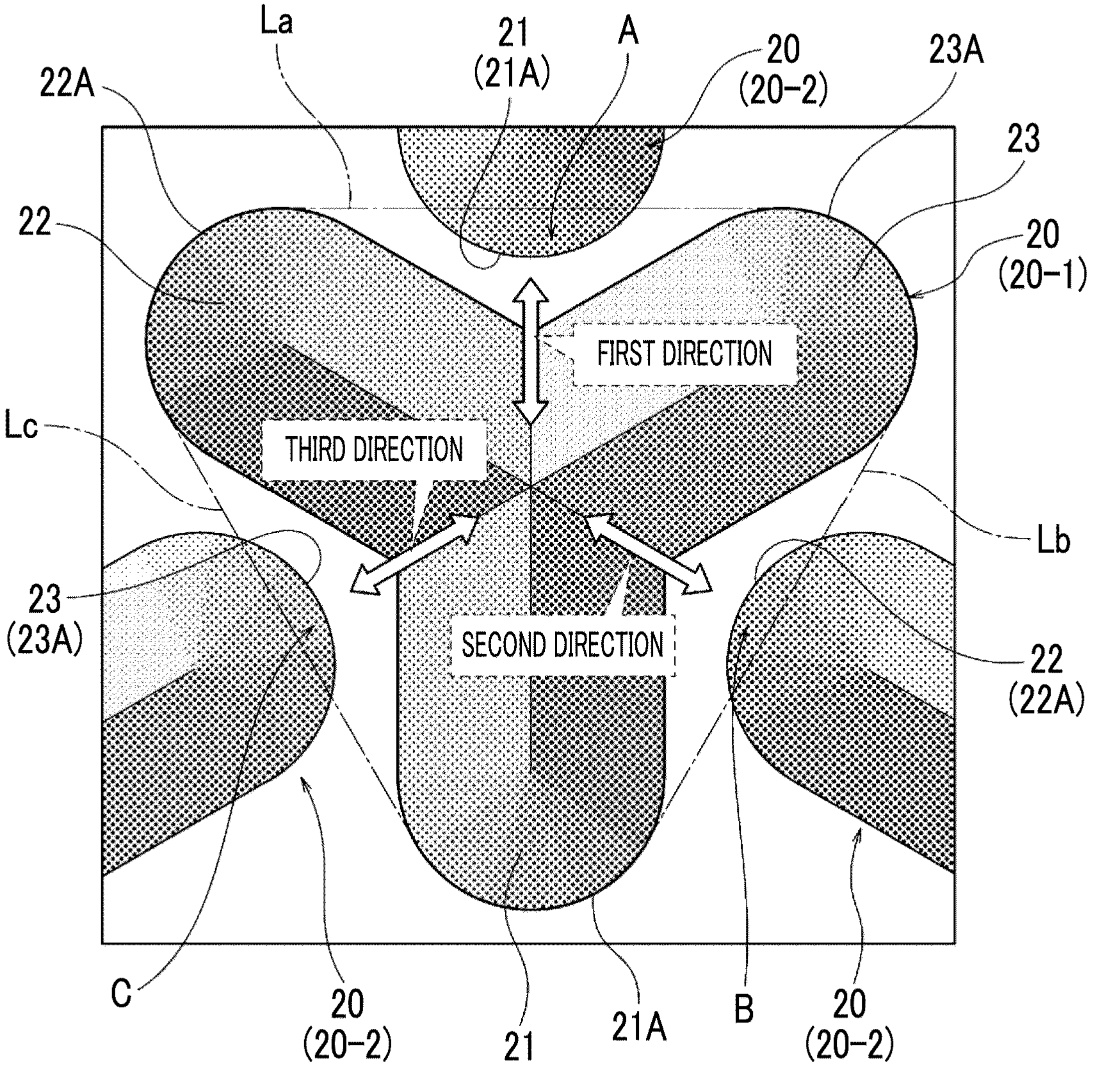
FIG. 5 is a diagram showing a positional relationship between adjacent surface shape portions shown in FIG. 1.

FIG. 5 is a diagram showing a positional relationship between adjacent surface shape portions 20 shown in FIG. 1. In the repeating pattern formed by the plurality of surface shape portions 20, a positional relationship between one surface shape portion 20-1 and the other surface shape portion 20-2 of the adjacent surface shape portions 20 is set as follows.

That is, in the surface shape portions 20 adjacent in the first direction, the first shape portion 21 of the other surface shape portion 20-2 enters in a first region A, which is a region between the second shape portion 22 and the third shape portion 23 of the one surface shape portion 20-1. In a case where a first tangent line La, which is a tangent line touching the second end portion 22A of the second shape portion 22 and the third end portion 23A of the third shape portion 23 of the one surface shape portion 20-1, is set on a side of the first shape portion 21 of the other surface shape portion 20-2, the first region A is defined as a region surrounded by the first tangent line La and the second shape portion 22 and the third shape portion 23 of the one surface shape portion 20-1. Specifically, the first end portion 21A of the first shape portion 21 of the other surface shape portion 20-2 enters the first region A.

Similarly, in the surface shape portions 20 adjacent in the second direction, the second shape portion 22 of the other surface shape portion 20-2 enters in a second region B, which is a region between the first shape portion 21 and the third shape portion 23 of the one surface shape portion 20-1. In a case where a second tangent line Lb, which is a tangent line touching the first end portion 21A of the first shape portion 21 and the third end portion 23A of the third shape portion 23 of the one surface shape portion 20-1, is set on a side of the second shape portion 22 of the other surface shape portion 20-2, the second region B is defined as a region surrounded by the second tangent line Lb and the first shape portion 21 and the third shape portion 23 of the one surface shape portion 20-1. Specifically, the second end portion 22A of the second shape portion 22 of the other surface shape portion 20-2 enters the second region B.

In addition, in the surface shape portions 20 adjacent in the third direction, the third shape portion 23 of the other surface shape portion 20-2 enters in a third region C, which is a region between the first shape portion 21 and the second shape portion 22 of the one surface shape portion 20-1. In a case where a third tangent line Lc, which is a tangent line touching the first end portion 21A of the first shape portion 21 and the second end portion 22A of the second shape portion 22 of the one surface shape portion 20-1, is set on a side of the third shape portion 23 of the other surface shape portion 20-2, the third region C is defined as a region surrounded by the third tangent line Lc and the first shape portion 21 and the second shape portion 22 of the one surface shape portion 20-1. Specifically, the third end portion 23A of the third shape portion 23 of the other surface shape portion 20-2 enters the third region C.

The plurality of surface shape portions 20 described above are formed by using, for example, a mold having a laser-processed molding surface. The plurality of surface shape portions 20 having the above-described geometrically repeating pattern are realized by using the mold having the laser-processed molding surface.

Next, the actions and effects of the present embodiment will be described.

Figure 6:
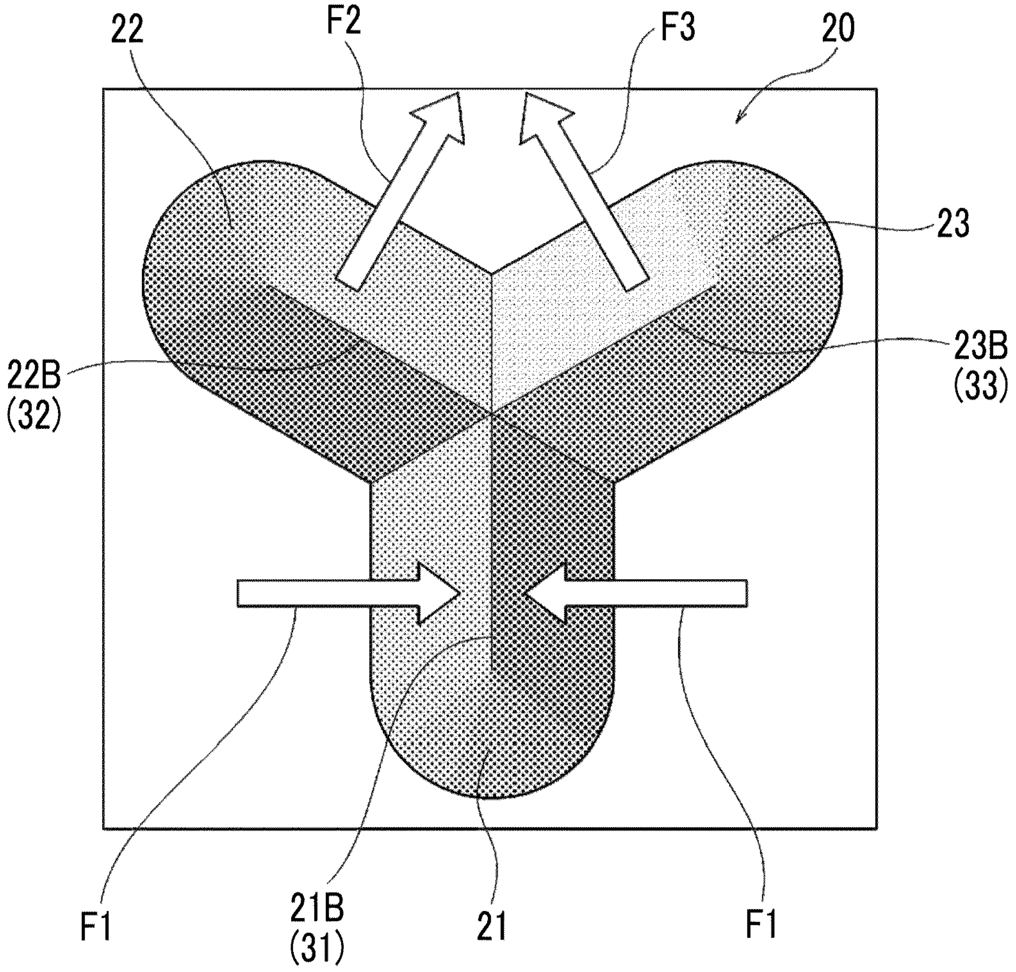
FIG. 6 is a diagram for describing an action of the surface shape portion shown in FIG. 1.

FIG. 6 is a diagram for describing an action of the surface shape portion 20 shown in FIG. 1. In a case where the user grips the grip portion 16 from both sides of the imaging apparatus 10 in the lateral direction, a grip force F1 is applied to the surface shape portion 20 in the lateral direction. Here, for the surface shape portion 20, a grip force to the surface shape portion 20 is strengthened in a case where the grip force F1 is applied to the surface shape portion 20 in the lateral direction than in a case where the grip force F1 is applied to the surface shape portion 20 in the up-down direction, which prevents the imaging apparatus 10 from falling off. That is, the surface shape portion 20 has the first shape portion 21 as a shape in which the grip force to the surface shape portion 20 is strengthened, which prevents the imaging apparatus 10 from falling off, the first shape portion 21 extending in the direction orthogonal to the grip direction, which is a direction in which the grip force F1 is applied to the surface shape portion 20. Accordingly, in a case where the grip force F1 is applied to the surface shape portion 20 in the lateral direction, the grip force to the surface shape portion 20 can be secured.

In addition, in a case where the grip portion 16 is gripped by the user in a state where the up-down direction of the imaging apparatus 10 is the vertical direction, a contact pressure against the hand 100 of the user is higher in a portion of the second shape portion 22 below the second ridge line 32 than in a portion above the second ridge line 32 by means of gravitational force acting on the imaging apparatus 10. Similarly, the contact pressure against the hand 100 of the user is higher in a portion of the third shape portion 23 below the third ridge line 33 than in a portion above the third ridge line 33. In this state, in a case where the grip force F1 is applied to the surface shape portion 20 in the lateral direction, components of a force F2 and F3 as a lifting force are generated in an upward direction by the surface shape portion 20. The component of a force F2 is a component of a force in the direction orthogonal to the second direction, and the component of a force F3 is a component of a force in the direction orthogonal to the third direction. That is, the surface shape portion 20 has the second shape portion 22 and the third shape portion 23 extending obliquely upward, as a shape that generates the components of a force F2 and F3 as the lifting force in the upward direction. Specifically, the second shape portion 22 generates the component of a force F2 in the direction orthogonal to the second direction, which is the direction in which the second shape portion 22 extends, and the third shape portion 23 generates the component of a force F3 in the direction orthogonal to the third direction, which is the direction in which third shape portion 23 extends. Accordingly, in a case where the grip force F1 is applied to the surface shape portion 20 in the lateral direction, a lifting force to the surface shape portion 20 can be secured.

In this way, since the grip force and the lifting force can be generated in a case where the grip force F1 is applied to the surface shape portion 20 in the lateral direction, the grip performance of the grip portion 16 (that is, the performance indicating the difficulty of sliding to the lower side in the vertical direction) can be improved compared to a case where the grip portion 16 has unevenness, for example, by means of etching.

In addition, the first shape portion 21 has the first ridge line 31 at the first top portion 21B, the second shape portion 22 has the second ridge line 32 at the second top portion 22B, and the third shape portion 23 has a third ridge line 33 at the third top portion 23B. Therefore, for example, as compared with a case where the first top portion 21B, the second top portion 22B, and the third top portion 23B are formed by a curved surface, respectively, a catching force of the surface shape portion 20 with respect to the hand 100 of the user can be strengthened.

In addition, as shown in FIG. 3, the first shape portion 21 is formed in a three-dimensional shape in which the width expands in the direction orthogonal to the first direction from the first top portion 21B toward the first base portion 21C. Similarly, the second shape portion 22 is formed in a three-dimensional shape in which the width expands in the direction orthogonal to the second direction from the second top portion 22B toward the second base portion 22C, and the third shape portion 23 is formed in a three-dimensional shape in which the width expands in the direction orthogonal to the third direction from the third top portion 23B toward the third base portion 23C. Therefore, for example, as compared with a case where the first shape portion 21, the second shape portion 22, and the third shape portion 23 are formed in a three-dimensional shape having a rectangular cross section (that is, a three-dimensional shape having a constant width in the height direction), respectively, a wide contact area between the first shape portion 21, the second shape portion 22, and the third shape portion 23 and the hand 100 of the user can be secured.

Further, as shown in FIG. 4, the plurality of surface shape portions 20 form a repeating pattern and are formed to be distributed in the grip portion 16. Therefore, for example, as compared with a case where one surface shape portion 20 is formed in the grip portion 16, the grip performance can be improved over a wide range of the grip portion 16.

Further, as shown in FIG. 5, the first end portion 21A of the first shape portion 21 is formed in an arc shape. Therefore, for example, as compared with a case where the first end portion 21A is formed in a rectangular shape, in the surface shape portions 20 adjacent in the first direction, the first end portion 21A of the other surface shape portion 20-2 can be arranged close to the second shape portion 22 and the third shape portion 23 of the one surface shape portion 20-1. Similarly, the second end portion 22A of the second shape portion 22 is formed in an arc shape. Therefore, for example, as compared with a case where the second end portion 22A is formed in a rectangular shape, in the surface shape portions 20 adjacent in the second direction, the second end portion 22A of the other surface shape portion 20-2 can be arranged close to the first shape portion 21 and the third shape portion 23 of the one surface shape portion 20-1. In addition, the third end portion 23A of the third shape portion 23 is formed in an arc shape. Therefore, for example, as compared with a case where the third end portion 23A is formed in a rectangular shape, in the surface shape portions 20 adjacent in the third direction, the third end portion 23A of the other surface shape portion 20-2 can be arranged close to the first shape portion 21 and the second shape portion 22 of the one surface shape portion 20-1. With the above, the plurality of surface shape portions 20 can be arranged at a high density.

Next, modification examples of the present embodiment will be described.

Figure 7:
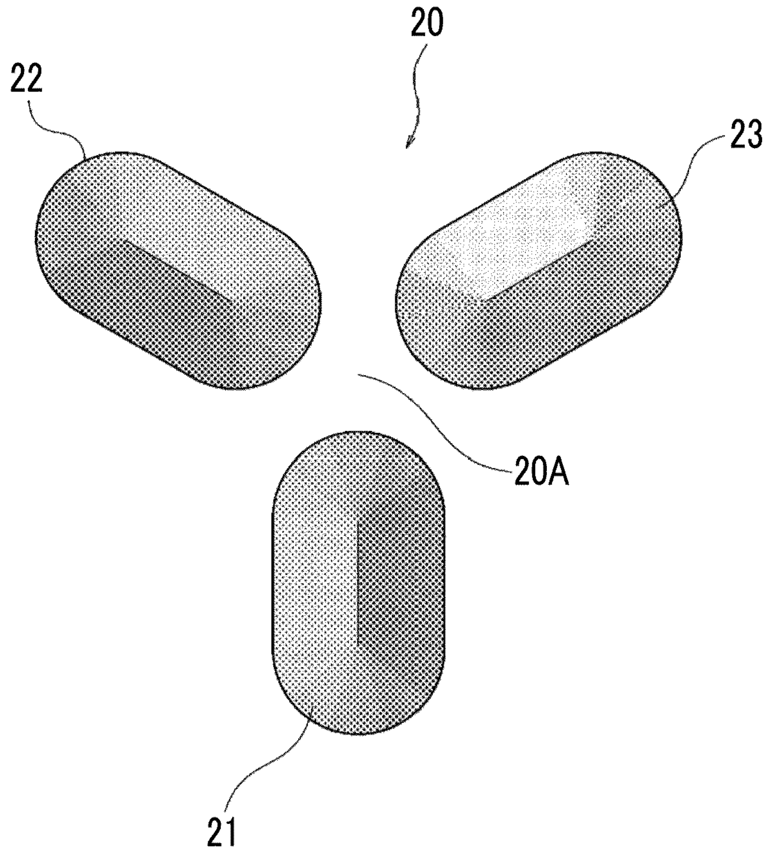
FIG. 7 is a diagram showing the surface shape portion according to a first modification example.

FIG. 7 is a diagram showing the surface shape portion 20 according to a first modification example. In the above-described embodiment (see FIG. 2), the first shape portion 21, the second shape portion 22, and the third shape portion 23 are connected to each other at the central portion 20A. However, as shown in FIG. 7, the first shape portion 21, the second shape portion 22, and the third shape portion 23 may be separated from each other at the central portion 20A. Further, any one of the first shape portion 21, the second shape portion 22, or the third shape portion 23 may be separated from the remaining two. Even with such a configuration, the same actions and effects as those of the above-described embodiment can be obtained.

Figure 8:
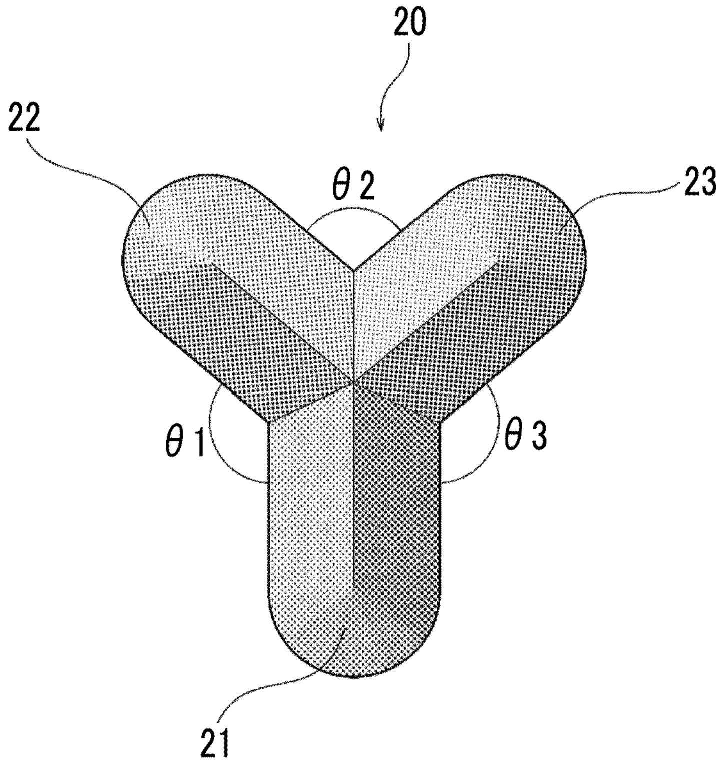
FIG. 8 is a diagram showing the surface shape portion according to a second modification example.

FIG. 8 is a diagram showing the surface shape portion 20 according to a second modification example. In the above-described embodiment (see FIG. 2), the angle θ1 formed between the first shape portion 21 and the second shape portion 22, the angle θ2 formed between the second shape portion 22 and the third shape portion 23, and the angle θ3 formed between the third shape portion 23 and the first shape portion 21 are all obtuse angles. However, as shown in FIG. 8, the angle θ1 and the angle θ3 may be obtuse angles, and the angle θ2 may be an acute angle. In addition, the angle θ1, the angle θ2, and the angle θ3 may be an angle other than 120°, respectively. Even with such a configuration, the same actions and effects as those of the above-described embodiment can be obtained.

Figure 9:
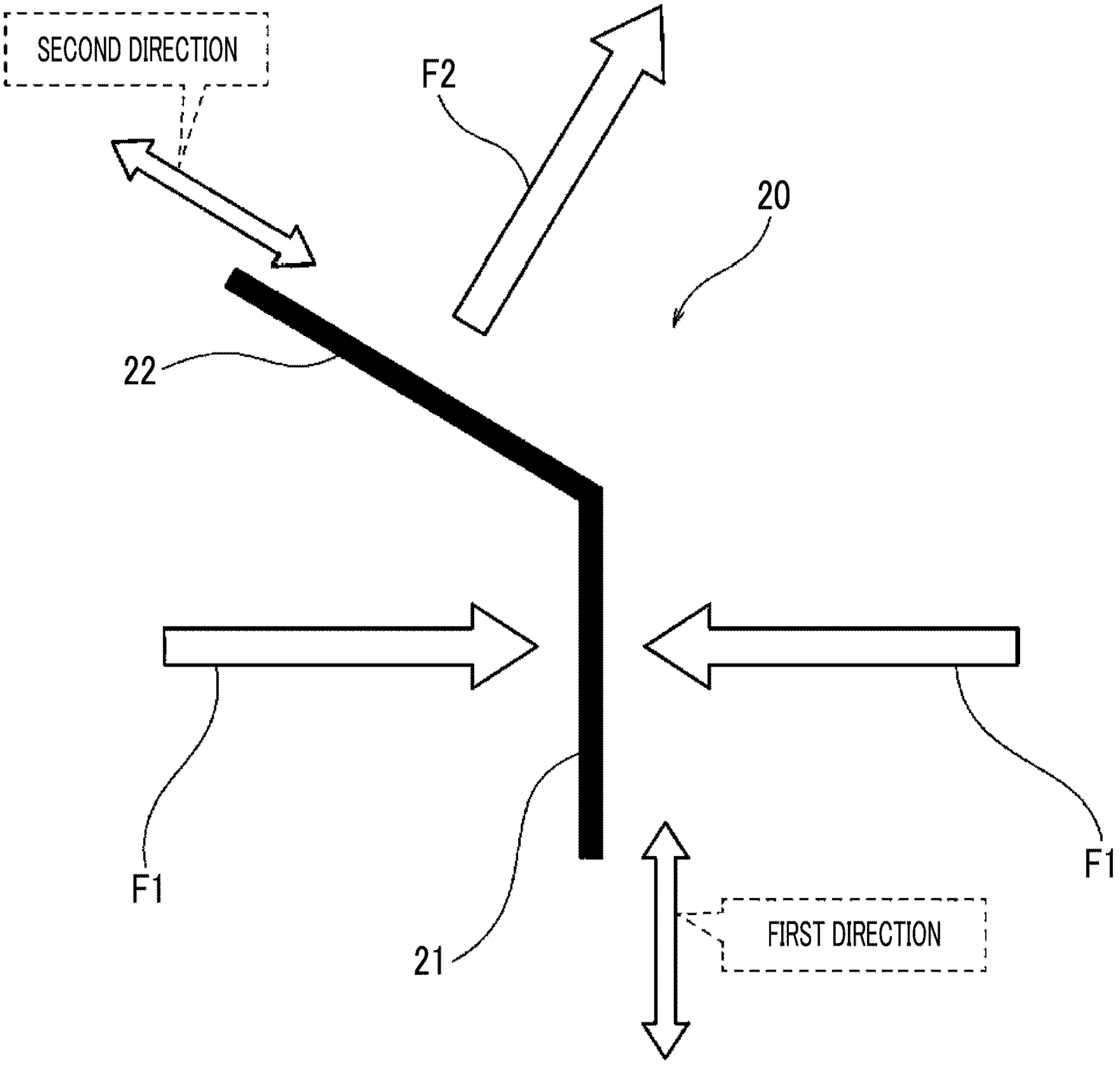
FIG. 9 is a diagram showing the surface shape portion according to a third modification example.

FIG. 9 is a diagram showing the surface shape portion 20 according to a third modification example. In the above-described embodiment (see FIG. 6), the surface shape portion 20 has the first shape portion 21, the second shape portion 22, and the third shape portion 23. However, as shown in FIG. 9, the surface shape portion 20 may have a configuration in which the first shape portion 21 and the second shape portion 22 are provided and the third shape portion 23 is omitted.

Even with such a configuration, in a case where the grip force F1 is applied to the surface shape portion 20 in the lateral direction, the grip force to the surface shape portion 20 can be secured by the first shape portion 21. In addition, in a case where the grip force F1 is applied to the surface shape portion 20 in the lateral direction, since the component of a force F2 as a lifting force can be generated in the upward direction by the second shape portion 22, the lifting force to the surface shape portion 20 can be secured.

Figure 10:
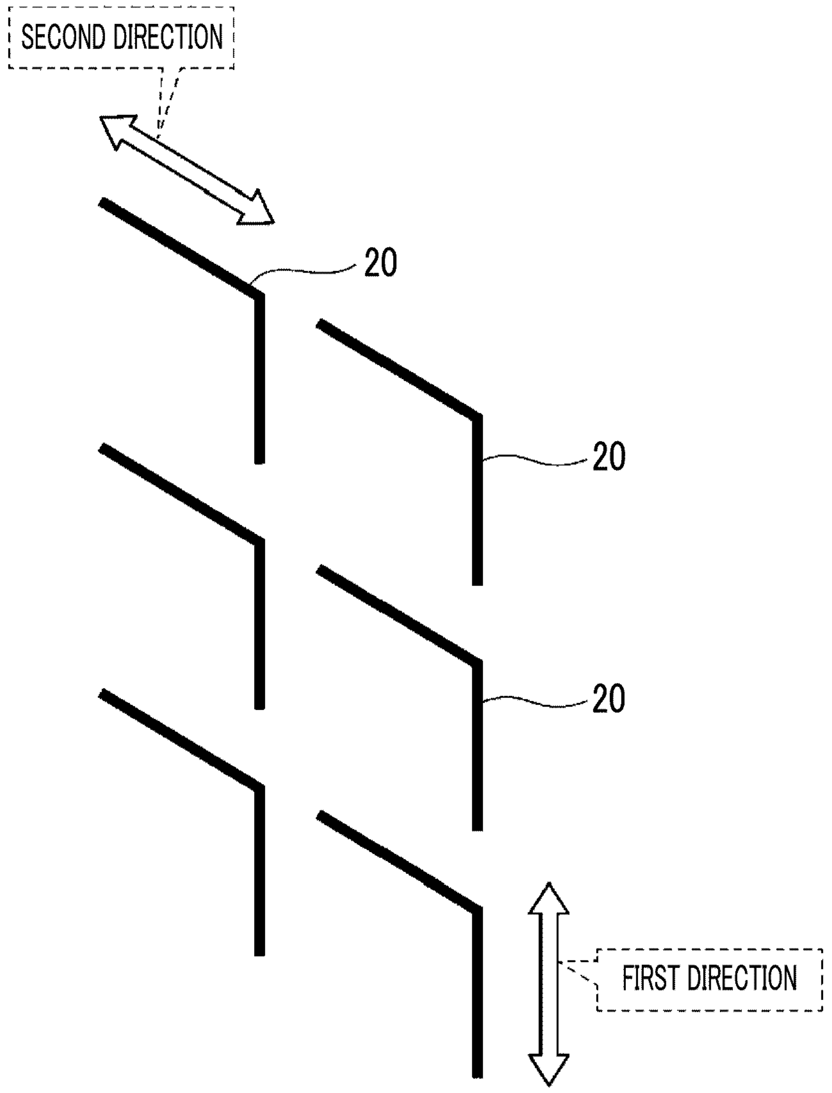
FIG. 10 is a diagram showing a part of the repeating pattern formed by the plurality of surface shape portions according to the third modification example.

FIG. 10 is a diagram showing a part of the repeating pattern formed by the plurality of surface shape portions 20 according to the third modification example. In the third modification example shown in FIG. 10, the plurality of surface shape portions 20 are arranged along the first direction and the second direction to form a repeating pattern. Even in a case where the repeating pattern is formed in this manner, for example, as compared with a case where one surface shape portion 20 is formed in the grip portion 16, the grip performance can be improved over a wide range of the grip portion 16.

Figure 11:
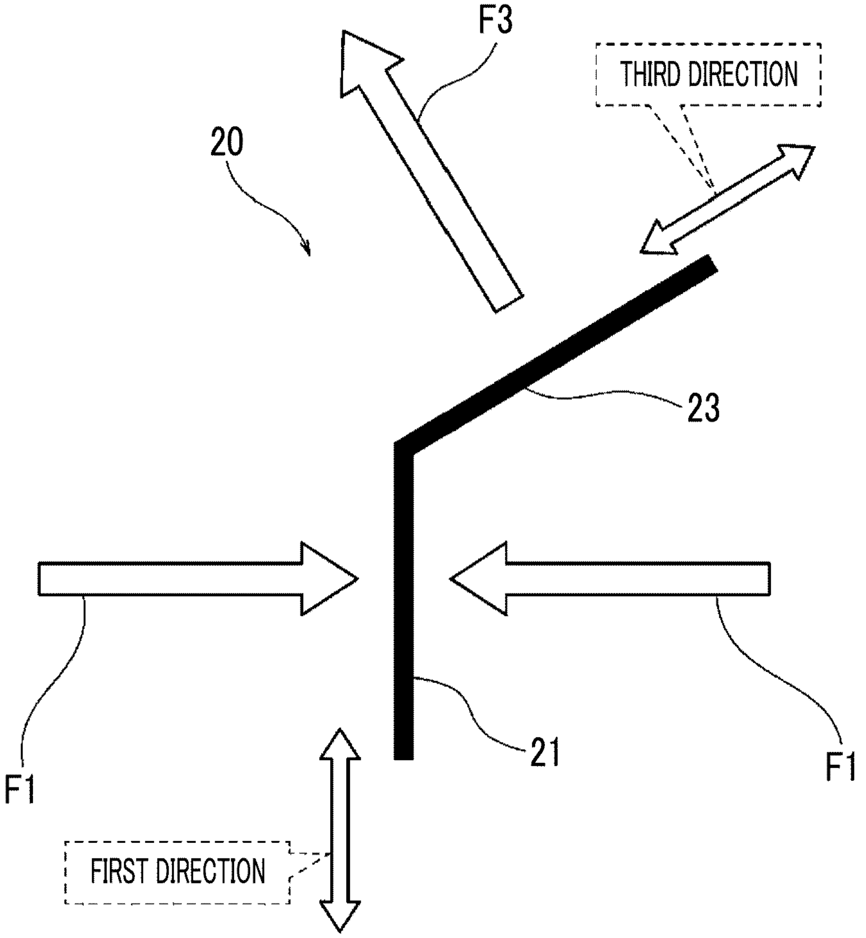
FIG. 11 is a diagram showing the surface shape portion according to a fourth modification example.

FIG. 11 is a diagram showing the surface shape portion 20 according to a fourth modification example. As shown in FIG. 11, the surface shape portion 20 may have a configuration in which the first shape portion 21 and the third shape portion 23 are provided and the second shape portion 22 is omitted.

Even with such a configuration, in a case where the grip force F1 is applied to the surface shape portion 20 in the lateral direction, the grip force to the surface shape portion 20 can be secured by the first shape portion 21. In addition, in a case where the grip force F1 is applied to the surface shape portion 20 in the lateral direction, since the component of a force F3 as a lifting force can be generated in the upward direction by the third shape portion 23, the lifting force to the surface shape portion 20 can be secured.

Figure 12:
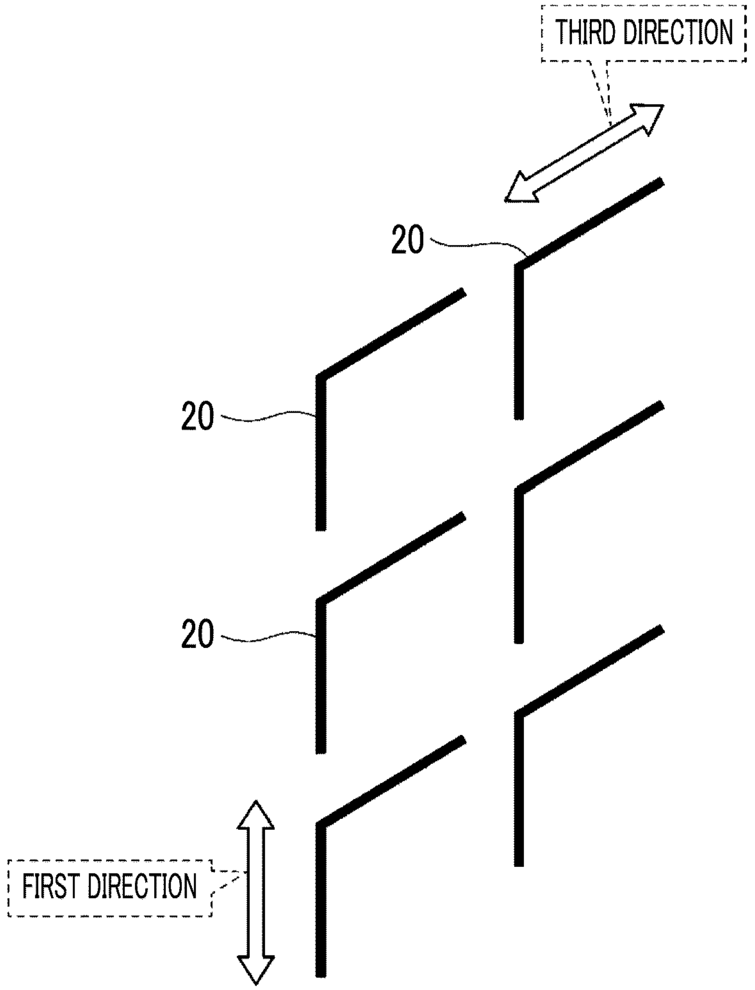
FIG. 12 is a diagram showing a part of the repeating pattern formed by the plurality of surface shape portions according to the fourth modification example.

FIG. 12 is a diagram showing a part of the repeating pattern formed by the plurality of surface shape portions 20 according to the fourth modification example. In the fourth modification example shown in FIG. 12, the plurality of surface shape portions 20 are arranged along the first direction and the third direction to form a repeating pattern. Even in a case where the repeating pattern is formed in this manner, for example, as compared with a case where one surface shape portion 20 is formed in the grip portion 16, the grip performance can be improved over a wide range of the grip portion 16.

Figure 13:
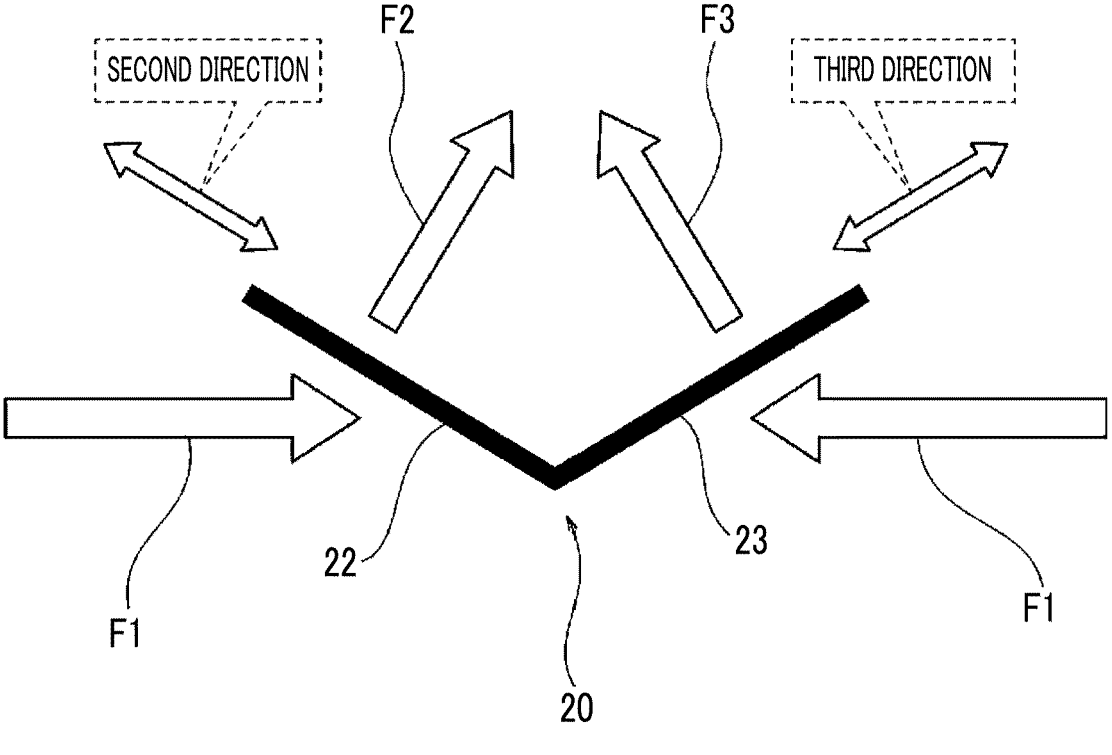
FIG. 13 is a diagram showing the surface shape portion according to a fifth modification example.

FIG. 13 is a diagram showing the surface shape portion 20 according to a fifth modification example. As shown in FIG. 13, the surface shape portion 20 may have a configuration in which the second shape portion 22 and the third shape portion 23 are provided and the first shape portion 21 is omitted.

Even with such a configuration, in a case where the grip force F1 is applied to the surface shape portion 20 in the lateral direction, since the components of a force F2 and F3 as a lifting force can be generated in the upward direction by the second shape portion 22 and the third shape portion 23, the lifting force to the surface shape portion 20 can be secured.

Figure 14:
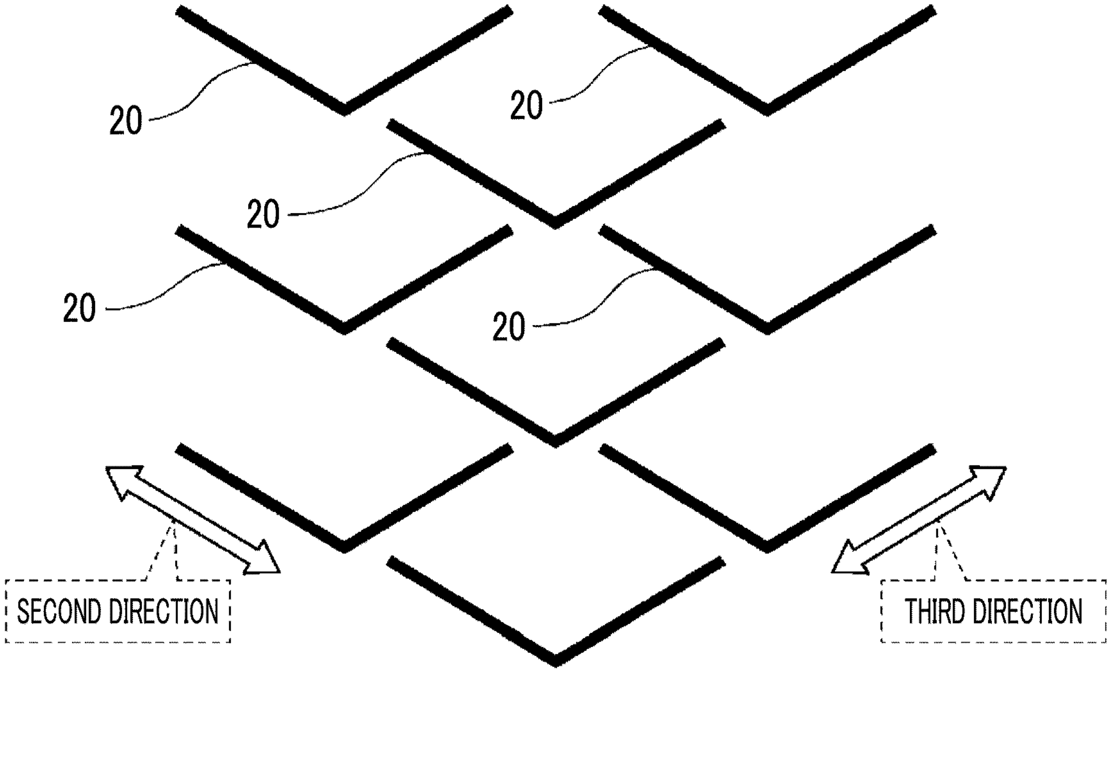
FIG. 14 is a diagram showing a part of the repeating pattern formed by the plurality of surface shape portions according to the fifth modification example.

FIG. 14 is a diagram showing a part of the repeating pattern formed by the plurality of surface shape portions 20 according to the fifth modification example. In the fifth modification example shown in FIG. 14, the plurality of surface shape portions 20 are arranged along the second direction and the third direction to form a repeating pattern. Even in a case where the repeating pattern is formed in this manner, for example, as compared with a case where one surface shape portion 20 is formed in the grip portion 16, the grip performance can be improved over a wide range of the grip portion 16.

In the fifth modification example, the second shape portion 22 is an example of a first shape portion according to the technology of the present disclosure, and the third shape portion 23 is an example of a second shape portion or a third shape portion according to the technology of the present disclosure. In addition, the second direction is an example of a first direction according to the technology of the present disclosure, and the third direction is an example of a second direction or a third direction according to the technology of the present disclosure.

Further, in the above-described embodiment, the plurality of surface shape portions 20 (see FIG. 4) are arranged such that each central portion 20A is positioned on the first line L1, the second line L2, and the third line L3, respectively. However, the plurality of surface shape portions 20 may be arranged such that each central portion 20A is arranged at a position shifted from at least one of the first line L1, the second line L2, or the third line L3. Even with such a configuration, the same actions and effects as those of the above-described embodiment can be obtained.

Further, in the above-described embodiment, the first shape portion 21, the second shape portion 22, and the third shape portion 23 are all formed in a three-dimensional shape, but may be formed in a groove shape. Even with such a configuration, the same actions and effects as those of the above-described embodiment can be obtained. The three-dimensional shape and the groove shape may be regarded as a three-dimensional shape.

Further, in the above-described embodiment, the grip portion 16 has the plurality of surface shape portions 20, but may have one surface shape portion 20. Even with such a configuration, in a case where the grip force F1 is applied to the surface shape portion 20 in the lateral direction, the grip force to the surface shape portion 20 can be secured by the first shape portion 21. In addition, in a case where the grip force F1 is applied to the surface shape portion 20 in the lateral direction, since the components of a force F2 and F3 as a lifting force can be generated in the upward direction by the second shape portion 22 and the third shape portion 23, the lifting force to the surface shape portion 20 can be secured.

Further, in the above-described embodiment, the plurality of surface shape portions 20 are arranged along the first direction, the second direction, and the third direction to form a repeating pattern having regularity, but may be randomly arranged to form an irregular pattern. Even with such a configuration, the same actions and effects as those of the above-described embodiment can be obtained.

Further, in the above-described embodiment, the first shape portion 21, the second shape portion 22, and the third shape portion 23 are formed in the same shape as each other, but may be formed in different shapes from each other. Further, any one of the first shape portion 21, the second shape portion 22, or the third shape portion 23 may have a different shape from the remaining two. Even with such a configuration, the same actions and effects as those of the above-described embodiment can be obtained.

Further, in the above-described embodiment, the first end portion 21A, the second end portion 22A, and the third end portion 23A are all formed in an arc shape, but may be formed in a distal end angle shape. Even in such a configuration, for example, as compared with a case where the first end portion 21A, the second end portion 22A, and the third end portion 23A are formed in a rectangular shape, the plurality of surface shape portions 20 can be arranged at high density.

Further, in the above-described embodiment, the first shape portion 21 is formed in a triangular cross-section shape as an example of a three-dimensional shape in which the width expands in the direction orthogonal to the first direction from the first top portion 21B toward the first base portion 21C, but may be formed in a cross-sectional shape other than the triangular cross-section shape, such as a semi-circular cross-section shape or a trapezoidal cross-section shape. Similarly, the second shape portion 22 and the third shape portion 23 may also be formed in a cross-sectional shape other than the triangular cross-section shape, such as a semi-circular cross-section shape or a trapezoidal cross-section shape.

Further, in the above-described embodiment, the first direction is the direction orthogonal to the grip direction (that is, the lateral direction of the imaging apparatus 10) as an example of the direction intersecting the grip direction, but may be a direction tilted with respect to the grip direction.

Further, in the above-described embodiment, the surface shape portion 20 has the first shape portion 21 as an example of a shape in which the grip force to the surface shape portion 20 is strengthened in a case where the grip force F1 is applied to the surface shape portion 20 in the lateral direction than in a case where the grip force F1 is applied to the surface shape portion 20 in the up-down direction, but may have another shape instead of the first shape portion 21 or in addition to the first shape portion 21.

Further, in the above-described embodiment, the surface shape portion 20 has the second shape portion 22 and the third shape portion 23 as an example of a shape that generates the components of a force F2 and F3 as a lifting force in the upward direction in a case where the grip force F1 is applied to the surface shape portion 20 in the lateral direction, but may have another shape instead of the second shape portion 22 and the third shape portion 23 or in addition to the second shape portion 22 and the third shape portion 23.

Further, in the above-described embodiment, the first shape portion 21, the second shape portion 22, and the third shape portion 23 may be regarded as a plurality of extension portions that extend in different directions from each other along the surface of the grip portion 16. In addition, the number of the plurality of extension portions may be any number.

In addition, in the above-described embodiment, a digital camera is exemplified as an example of the imaging apparatus 10, but the imaging apparatus 10 may be any type of camera other than the digital camera. In addition, the grip portion 16 is applied to the imaging apparatus 10, but may be applied to various apparatuses other than the imaging apparatus 10. Examples of the apparatus include an electronic binocle and a battery device.

Among a plurality of the modification examples described above, the modification examples that can be combined may be appropriately combined.

The content of the above description and the content of the drawings are detailed description of portions according to the technology of the present disclosure, and are merely examples of the technology of the present disclosure. For example, the above description relating to configurations, functions, operations, and advantageous effects is description relating to an example of configurations, functions, operations, and advantageous effects of the portions according to the technology of the present disclosure. Thus, it is needless to say that unnecessary portions may be deleted, new elements may be added, or replacement may be made to the content of the above description and the content of the drawings without departing from the gist of the technology of the present disclosure. Furthermore, to avoid confusion and to facilitate understanding of the portions according to the technology of the present disclosure, description relating to common technical knowledge and the like that does not require particular description to enable implementation of the technology of the present disclosure is omitted from the content of the above description and from the content of the drawings.

In this specification, "A and/or B" is synonymous with "at least one of A or B". That is, "A and/or B" may refer to A alone, B alone, or a combination of A and B. Furthermore, in this specification, a similar concept to "A and/or B" applies to a case in which three or more matters are expressed by linking the matters with "and/or".

All cited documents described in this specification are incorporated by reference in this specification to the same extent as in a case where each individual cited document is specifically and individually indicated to be incorporated by reference.

In regard to the above-described embodiment, the following supplementary notes will be disclosed.

Supplementary Note 1

The apparatus according to any one of the first to twenty-eighth aspects,
- in which a height of the first shape portion is 0.1 mm or more and 0.5 mm or less, and
- a height of the second shape portion and/or the third shape portion is 0.1 mm or more and 0.5 mm or less.

Supplementary Note 2

The apparatus according to any one of the first to twenty-eighth aspects,
- in which a width of the first shape portion is 0.5 mm or more and 1.2 mm or less, and
- a width of the second shape portion and/or the third shape portion is 0.5 mm or more and 1.2 mm or less.

Supplementary Note 3

The apparatus according to any one of the first to twenty-eighth aspects,
- in which a length of the first shape portion is 0.5 mm or more and 2 mm or less, and
- a length of the second shape portion and/or the third shape portion is 0.5 mm or more and 2 mm or less.

What is claimed is:

1. An apparatus comprising:

a grip portion having a surface shape portion, wherein the surface shape portion has
- a first shape portion extending in a first direction, and
- at least one of a second shape portion extending in a second direction and a third shape portion extending in a third direction, wherein a length of the first shape portion in the first direction is 0.5 mm or more and 2 mm or less, and a width of the first shape portion in a fourth direction orthogonal to the first direction is 0.5 mm or more and 1.2 mm or less, wherein an end portion of the first shape portion in the first direction is formed in an arc shape or a distal end angle shape, and at least a portion of the first shape portion other than the end portion has a constant width, in the fourth direction, along the first direction.

2. The apparatus according to claim 1, wherein the grip portion has a plurality of the surface shape portions.

3. The apparatus according to claim 1, wherein a plurality of the surface shape portions form a repeating pattern.

4. The apparatus according to claim 3, wherein the repeating pattern includes an embossed pattern.

5. The apparatus according to claim 3, wherein the repeating pattern is a pattern in which the plurality of surface shape portions are arranged along the first direction and are arranged along the second direction and/or the third direction.

6. The apparatus according to claim 5, wherein each of the surface shape portions has the second shape portion and the third shape portion, the repeating pattern is a pattern in which the plurality of surface shape portions are arranged along the first direction, the second direction, and the third direction, and the repeating pattern is a pattern in which
- the first shape portion of the other surface shape portion of the surface shape portions adjacent in the first direction enters a first region, which is a region between the second shape portion and the third shape portion of one surface shape portion of the surface shape portions adjacent in the first direction,
- the second shape portion of the other surface shape portion of the surface shape portions adjacent in the second direction enters a second region, which is a region between the first shape portion and the third shape portion of one surface shape portion of the surface shape portions adjacent in the second direction, and
- the third shape portion of the other surface shape portion of the surface shape portions adjacent in the third direction enters a third region, which is a region between the first shape portion and the second shape portion of one surface shape portion of the surface shape portions adjacent in the third direction.

7. The apparatus according to claim 1, wherein the surface shape portion is formed in a three-dimensional shape.

8. The apparatus according to claim 1, wherein the surface shape portion has the second shape portion and the third shape portion.

9. The apparatus according to claim 1, wherein the first shape portion extends from a central portion of the surface shape portion, and the second shape portion and/or the third shape portion extends from the central portion.

10. The apparatus according to claim 1, wherein the first direction is a direction of gravitational force of the apparatus, and the second direction and/or the third direction is a direction tilted with respect to the direction of gravitational force.

11. The apparatus according to claim 10,
wherein the second shape portion and/or the third shape portion is positioned on an upper side of the first shape portion in the direction of gravitational force.

12. The apparatus according to claim 10,
wherein the first shape portion extends downward from a central portion of the surface shape portion in the direction of gravitational force, and
the second shape portion and/or the third shape portion extends obliquely upward from the central portion.

13. The apparatus according to claim 1,
wherein the apparatus is an imaging apparatus.

14. The apparatus according to claim 1,
wherein the first shape portion, and the second shape portion and/or the third shape portion are formed in the same shape.

15. The apparatus according to claim 1,
wherein the first shape portion, and the second shape portion and/or the third shape portion are connected to each other.

16. The apparatus according to claim 1,
wherein the first shape portion, and the second shape portion and/or the third shape portion are separated from each other.

17. The apparatus according to claim 1,
wherein an angle formed between the first shape portion and the second shape portion or the third shape portion is an obtuse angle.

18. The apparatus according to claim 17,
wherein the angle is 120°.

19. The apparatus according to claim 1,
wherein an end portion of the second shape portion in the second direction and/or an end portion of the third shape portion in the third direction is formed in an arc shape or a distal end angle shape.

20. The apparatus according to claim 1,
wherein the surface shape portion has the second shape portion,
the first shape portion and the second shape portion are formed in a three-dimensional shape, respectively,
a first top portion, which is a top portion of the first shape portion, has a first ridge line that is a ridge line extending in the first direction, and
a second top portion, which is a top portion of the second shape portion, has a second ridge line that is a ridge line extending in the second direction.

21. The apparatus according to claim 20,
wherein the surface shape portion has the third shape portion,
the third shape portion is formed in a three-dimensional shape, and
a third top portion, which is a top portion of the third shape portion, has a third ridge line that is a ridge line extending in the third direction.

22. The apparatus according to claim 21,
wherein the three-dimensional shape of the third shape portion is a three-dimensional shape in which a width expands in a direction orthogonal to the third direction from the third top portion toward a third base portion, which is a base portion of the third shape portion.

23. The apparatus according to claim 20,
wherein the three-dimensional shape of the first shape portion is a three-dimensional shape in which a width expands in a direction orthogonal to the first direction from the first top portion toward a first base portion, which is a base portion of the first shape portion, and
the three-dimensional shape of the second shape portion is a three-dimensional shape in which a width expands in a direction orthogonal to the second direction from the second top portion toward a second base portion, which is a base portion of the second shape portion.

24. The apparatus according to claim 1,
wherein the surface shape portion is formed by using a mold having a laser-processed molding surface.

25. An apparatus comprising:
a grip portion having a surface shape portion,
wherein the surface shape portion is formed in a shape that generates a component of a force in a direction intersecting a second direction or a third direction in a case where a grip force is applied to the surface shape portion in a direction intersecting a first direction,
wherein the surface shape portion has a first shape portion extending in the first direction, a length of the first shape portion in the first direction is 0.5 mm or more and 2 mm or less, and a width of the first shape portion in a fourth direction orthogonal to the first direction is 0.5 mm or more and 1.2 mm or less,
wherein an end portion of the first shape portion in the first direction is formed in an arc shape or a distal end angle shape, and at least a portion of the first shape portion other than the end portion has a constant width, in the fourth direction, along the first direction.

26. The apparatus according to claim 25,
wherein the component of a force is a component of a force as a lifting force.

27. The apparatus according to claim 25,
wherein the surface shape portion is formed in a shape in which a grip force to the surface shape portion is strengthened in a case where the grip force is applied to the surface shape portion in the direction intersecting the first direction than in a case where the grip force is applied to the surface shape portion in a direction of gravitational force.

28. An apparatus comprising:
a grip portion having a surface shape portion,
wherein the surface shape portion has
a first shape portion that extends in an intersection direction with a grip direction, which is a direction in which a grip force is applied to the surface shape portion, and
a second shape portion and/or a third shape portion that extends in a tilt direction with respect to the intersection direction and that generates a component of a force as a lifting force in a case where the grip force is applied to the surface shape portion,
wherein a length of the first shape portion in the intersection direction is 0.5 mm or more and 2 mm or less, and a width of the first shape portion in a width direction orthogonal to the intersection direction is 0.5 mm or more and 1.2 mm or less,
wherein an end portion of the first shape portion in the intersection direction is formed in an arc shape or a distal end angle shape, and a portion of the first shape portion other than the end portion has a constant width, in the width direction, along the intersection direction.

* * * * *